June 18, 1968 F. ROSEN 3,388,947
AUXILIARY CHILD'S SAFETY SEAT FOR VEHICLES
Filed Sept. 23, 1966
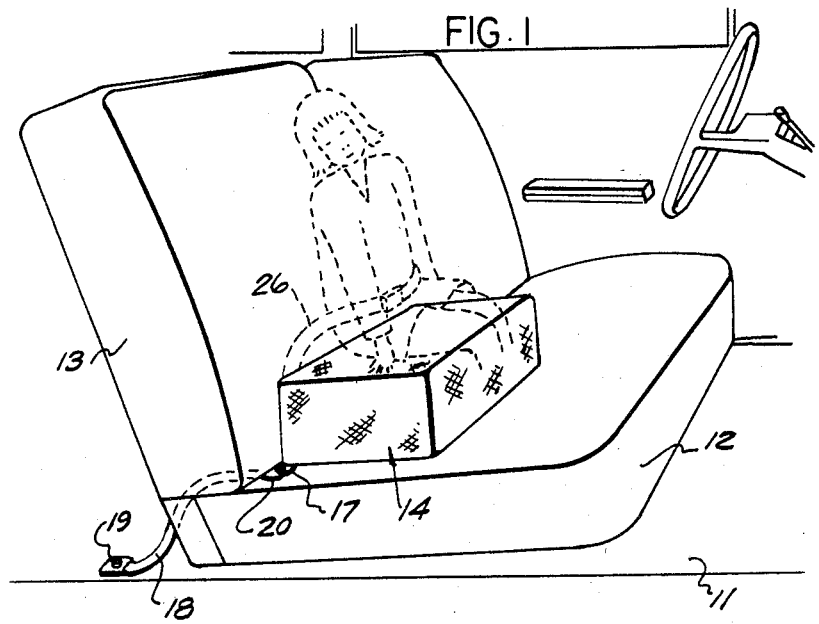
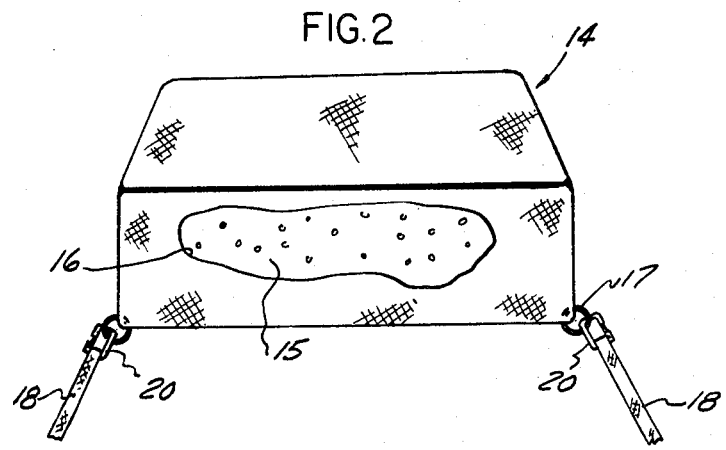
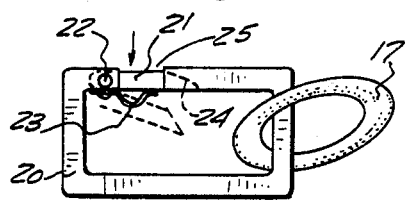
INVENTOR
FLORENCE ROSEN
BY *Cullen, Sloman, & Cantor*
ATTORNEYS United States Patent Office 3,388,947
Patented June 18, 1968

3,388,947
AUXILIARY CHILD'S SAFETY SEAT FOR VEHICLES
Florence Rosen, 17161 Denver, Apt. 2, Detroit, Mich. 48224
Filed Sept. 23, 1966, Ser. No. 581,532
2 Claims. (Cl. 297—250)

ABSTRACT OF THE DISCLOSURE

An auxiliary child's safety seat for a vehicle seat, having a backrest, including a block of resilient material mounted on the seat against the backrest, a pair of anchor rings secured to the lower rear corners thereof, a continuous protective cover over the block independent of said rings, and a pair of anchor straps at their one ends fixed to the vehicle frame and at the other ends having resilient snap-fastener loops interlocked with said rings.

---

The present invention relates to an auxiliary child's seat for vehicles.

Heretofore various efforts have been made in providing auxiliary seating means for children, removably and otherwise mounted on the front seat of a vehicle or the backseat and wherein various difficulties have been experienced in fixedly securing the auxiliary seat to stay in position as required.

It is the object of the present invention to provide a novel and simple auxiliary child's seat for a vehicle, which incorporates a simplified seat construction, together with a simplified and improved means for fixedly anchoring the auxiliary seat to the main seat protecting against accidental displacement of the auxiliary seat, should there be a sudden stop of the vehicle.

It is another object of the present invention to provide an auxiliary child's seat for a vehicle, which incorporates means for anchoring the auxiliary seat to the vehicle frame, which are completely independent of conventional seat belt construction, and adapted for use in conjunction therewith.

These and other objects will be seen from the following specification and claims in conjunction with the appending drawing in which:

FIG. 1 is a fragmentary perspective view of a vehicle illustrating the positioning and use of the present auxiliary child's seat upon the vehicle seat.

FIG. 2 is a fragmentary partly broken away rear prespective view of the auxiliary seat.

FIG. 3 is an elevational view on an enlarged scale, illustrating one form of anchor snap clip for use in conjunction with the auxiliary seat anchoring means.

It will be understood that the above drawing illustrates merely a preferred embodiment of the invention, and that other embodiments are contemplated within the scope of the claims hereafter set forth.

Referring to the drawing, a vehicle is fragmentarily shown in FIG. 1 as including conventional frame 11, which includes the floor, a conventional vehicle seat 12, and associated therewith conventional backrest 13.

The present auxiliary child's safety generally indicated at 14 is snugly positioned upon a portion of seat 12 towards its rear so as to abut backrest 13. Means are provided for fixedly and snugly, yet removably, retaining the auxiliary seat with respect to the main seat.

The present auxiliary child's seat 14 is constructed of any suitable lightweight resilient material as, for example, rubber, sponge rubber, foam plastic or styrofoam, having such resiliency as will render the auxiliary seat comfortable. Said seat is formed in the shape of an elongated block 15, preferably of rectangular shape in cross-section. The continuous protective fabric covering 16, of cotton, linen, or nylon is fastened over and snugly extends around block 15 to provide the finished seat 14 of FIG. 1.

The auxiliary seat includes as a part thereof suitable anchor hold-down means which are fixedly secured at and project from the lower rear corners of said block. In the illustrative embodiment there are provided a pair of metal rings 17 for this purpose, which are fixedly secured at and project from the lower rear corners of block 15, and in a permanent manner such as will prevent disassembly of said rings therefrom. In the illustrative embodiment the rings are shown as being of metal. It is contemplated that suitable anchor straps or loops may be substituted, which are fixedly secured to block 15, or connected or suitably stitched to the cover 16.

There are provided a pair of flexible anchor straps 18 or a suitable strong nylon webbing or other reinforced flexible material similar to what is used with conventional seat belts. The one ends of straps 18 are fixedly secured at 19 to vehicle frame 11 in a conventional manner, with intermediate portions of said straps extending forwardly between the lower portion of the backrest and the rear portion of seat 12. The forward free ends of the respective straps have fixedly secured thereon the respective anchor snap fastening means, which in the present disclosure are shown as metal loop members 20. These are slotted at 25 and adapted to cooperatively receive and retain therein the respective seat anchoring rings 17, which may be snapped in place.

In the illustrative embodiment the anchor snap clips 20 are of general D or O-form, being constructed of metal, and normally bridging the entrant, slot 25, there is provided the detent 21 at one end pivotally mounted at 22 within a slotted portion of clip body 20. Said detent at its other tapered end normally nests within undercut slot 24, and is biased to such position by leaf spring 23.

By this construction the seat anchor ring 17 is easily snapped through slot 25 to the interior of the snap clip 20, where it is retained against accidental displacement or removal. In order to remove the said ring 17, all that is necessary is to manually depress the detent 21 sufficiently to permit the withdrawal of ring 17 from the assembly, FIG. 3.

It is contemplated that any other type of anchor snap clip could be employed suitably and fixedly secured to the respective straps 18, for cooperative interlock with rings 17. It is understood furthermore that straps 18, when assembled for anchoring the auxiliary seat, are taut at all times and thus the auxiliary seat is immovably positioned and anchored upon seat 12 against backrest 13.

A child is shown in FIG. 1 seated upon the auxiliary seat. The conventional seat belt 26, anchored in a suitable fashion to the vehicle frame, and in a conventional manner has its free ends removably interlocked around the child for cooperation with auxiliary seat 14, the latter having its own separate and independent means for anchoring the same seat assembly 12–13.

It is contemplated that the block 15, may be of any desired suitable shape, such as the shape of a stuffed toy or the like, to render the same more attractive to children.

The auxiliary seat of the present invention is known as a "Safety Susan."

Having described my invention reference should now be had to the following claims.

I claim:
1. An auxiliary child's safety seat for a vehicle having a frame, a seat and a backrest comprising:
   an elongated block of resilient material and of rectangular cross-section mounted on said seat and bearing against the backrest;

a pair of rings fixedly secured respectively, at and projecting from the lower rear corners of said block;

a pair of flexible anchor straps at their one ends fixedly secured to said frame rearwardly of said seat and extending forwardly between said seat and backrest;

anchor snap-fastening means upon the other ends of said straps removably but tightly secured respectively to said rings respectively to immovably retain said block on said seat against said backrest;

a continuous protective cover fastened over and enclosing said block;

said anchor strap fastening means including a slotted loop receiving a ring; and a retractable spring biased detent pivoted on said loop normally closing its slot.

2. In the auxiliary child's seat as defined in claim 1, and a seat belt for use with said auxiliary seat, with its free ends fixedly secured respectively to said frame, and with its other ends adapted to adjustably clamp about a child seated on said auxiliary seat.

References Cited

UNITED STATES PATENTS

| | | | |
|---|---|---|---|
| 203,238 | 5/1878 | Bonfoey | 24—233 |
| 1,724,003 | 8/1929 | Chamberlain | 24—233 |
| 2,218,951 | 10/1940 | Flaharty | 297—250 |
| 2,777,502 | 1/1957 | Travis | 297—250 |
| 3,207,552 | 9/1965 | Loughney | 297—250 X |
| 3,220,769 | 11/1965 | Regan | 297—384 |
| 3,325,213 | 6/1967 | Levy | 297—250 X |

FOREIGN PATENTS 1,010,272  11/1965  Great Britain.

JAMES T. McCALL, *Primary Examiner.*